(12) United States Patent
Stokman

(10) Patent No.: US 10,166,163 B1
(45) Date of Patent: Jan. 1, 2019

(54) GLASS OBJECTS INCLUDING FLOATING CREMAINS IN THE FORM OF AN IMAGE AND METHOD OF MAKING THE SAME

(71) Applicant: Jake Stokman, Minneapolis, MN (US)

(72) Inventor: Jake Stokman, Minneapolis, MN (US)

( * ) Notice: Subject to any disclaimer, the term of this patent is extended or adjusted under 35 U.S.C. 154(b) by 0 days.

(21) Appl. No.: 15/965,644

(22) Filed: Apr. 27, 2018

(51) Int. Cl.
*A61G 17/08* (2006.01)
*C03C 14/00* (2006.01)
*A61G 17/007* (2006.01)

(52) U.S. Cl.
CPC ........... *A61G 17/08* (2013.01); *A61G 17/007* (2013.01); *C03C 14/004* (2013.01); *C03C 2203/52* (2013.01)

(58) Field of Classification Search
CPC .... A61G 17/08; A61G 17/007; C03C 14/004; C03C 2203/52
USPC .......................... 27/1; 65/60.2, 66; 428/542.4
See application file for complete search history.

(56) References Cited

U.S. PATENT DOCUMENTS

| | | | | |
|---|---|---|---|---|
| 5,950,287 A * | 9/1999 | Cacciatore | ............. | A61G 17/08 27/1 |
| 7,861,385 B1 * | 1/2011 | Meyer | .................... | A61G 17/08 27/1 |
| 8,336,174 B1 * | 12/2012 | Johnson | ................ | A61G 17/007 27/1 |
| 8,627,555 B2 * | 1/2014 | Kennedy | ................ | A61G 17/08 27/1 |
| 9,393,170 B2 | 6/2016 | Savage | | |
| D789,019 S * | 6/2017 | Kennedy | ........................ | D99/25 |
| 9,700,923 B2 * | 7/2017 | Camps | ....................... | F23G 1/00 |
| 2006/0016053 A1 * | 1/2006 | Desmond | ............... | A61G 17/04 27/1 |
| 2010/0005835 A1 * | 1/2010 | Johnson, Sr. | ........ | A44C 17/006 63/36 |
| 2010/0199476 A1 | 8/2010 | Cummings et al. | | |
| 2012/0180275 A1 * | 7/2012 | Kocir | ..................... | A61G 17/08 27/1 |
| 2012/0317765 A1 * | 12/2012 | Johnson | ................. | A61G 17/08 27/1 |
| 2013/0111797 A1 | 5/2013 | Kennedy | | |
| 2015/0013382 A1 * | 1/2015 | Murphy | .................... | A44C 9/00 63/15 |

FOREIGN PATENT DOCUMENTS

GB 2468709 9/2010

* cited by examiner

*Primary Examiner* — William L Miller
(74) *Attorney, Agent, or Firm* — Allison Johnson, P.A.

(57) ABSTRACT

A glass object that includes a first colored glass article, a second transparent glass layer in contact with the first glass article and having an exterior surface and a thickness, and an image formed from particles of cremated remains, the image being disposed within the thickness of the second glass layer between the first colored glass article and the exterior surface of the second glass layer and being free from contact with the first glass article, and a method of making the same.

17 Claims, 5 Drawing Sheets ated remains if they are in a place where they can be easily disturbed or lost. Thus, there is a need for holding the cremated remains of a deceased in an article that can be kept nearby without the fear of losing or disturbing the cremated remains. There is also a need for having such an article be aesthetically pleasing and able to evoke a pleasant memory of the deceased.

SUMMARY

In one aspect, the invention features a method of making a glass object, the method including contacting a colored glass article with a first gob of molten glass, contacting a pattern of cremated remains with the first gob of molten glass to transfer the pattern of cremated remains to a surface of the first gob, contacting the transferred cremated remains and the first gob with a second gob of molten glass, and annealing the glass to form a glass object having an exterior surface, the pattern of cremated remains being disposed between the colored glass article and the exterior surface of the glass object and forming an image that appears to float above the colored glass article. In one embodiment, the method further includes placing the cremated remains in the opening of a stencil to form the pattern of cremated remains prior to contacting the pattern of cremated remains with the gob of molten glass. In one embodiment, the method further includes placing the cremated remains in the opening of a stencil to form the pattern of cremated remains, and removing the stencil prior to contacting the pattern of cremated remains with the first gob of molten glass.

In other embodiments, the method further includes heating the transferred cremated remains prior to contacting the transferred cremated remains with the second gob of molten glass.

In another embodiment, the method further includes pushing a portion of the transferred cremated remains into the first gob of molten glass prior to contacting the transferred cremated remains and the first gob of molten glass with the second gob of molten glass, and forming a bubble near the portion of the transferred cremated remains when the second gob of molten glass contacts the transferred cremated remains.

In other aspects, the invention features a glass object that includes a first colored glass article, a second transparent glass layer in contact with the first glass article and having an exterior surface and a thickness, and an image formed of particles of cremated remains, the image being disposed within the thickness of the second glass layer and between the first colored glass article and the exterior surface of the second glass layer, the image being free from contact with the first colored glass article.

In one embodiment, the glass object is in the form of an orb. In another embodiment, the glass object is in the form of an orb and includes a planar surface. In some embodiments, the planar surface is located opposite the image.

In other embodiments, the image is in a plane within the glass object.

In another embodiment, the image includes a body in a first plane and at least one member extending from the body in an upward direction away from the first plane.

In other embodiments, the object includes a top and further includes a bubble positioned to appear at a center of the image when viewed from the top of the object. In some embodiments, the image includes a center portion and members extending radially from the center portion, and the bubble is positioned to appear at the center portion of the image when viewed from the top of the object.

In some embodiments, the image is in the form of a dragonfly, a butterfly, a heart, a pawprint, a dog, a cat, a star, a flower, or a combination thereof.

In another aspect, the invention features a glass object that includes a first glass article that includes a defined shape; a second transparent glass layer in contact with the first glass article and having an exterior surface and a thickness; and an image formed of particles of cremated remains, the image being disposed within the thickness of the second glass layer and between the first glass article and the exterior surface of the second glass layer, the image being free from contact with the first glass article.

The invention features a glass object for holding a portion of the cremated remains of a deceased that enables viewing of the remains and includes a portion of the cremated remains in a form or an image that evokes a memory of the deceased.

The invention also features a glass object for holding a portion of the cremated remains of a deceased in the form of an image that appears to float above a glass article within the glass object.

Other features and advantages will be apparent from the following description of the preferred embodiments and from the claims.

GLOSSARY

In reference to the invention, these terms have the meanings set forth below:

The term "cremated remains" refers to the ash and particles of a cremated cadaver.

The term "molten glass" refers to glass that is not fully solidified.

BRIEF DESCRIPTION OF THE DRAWINGS

Various aspects of this disclosure may be better understood upon reading the following detailed description and upon reference to the drawings in which.

DETAILED DESCRIPTION

Figure 1:
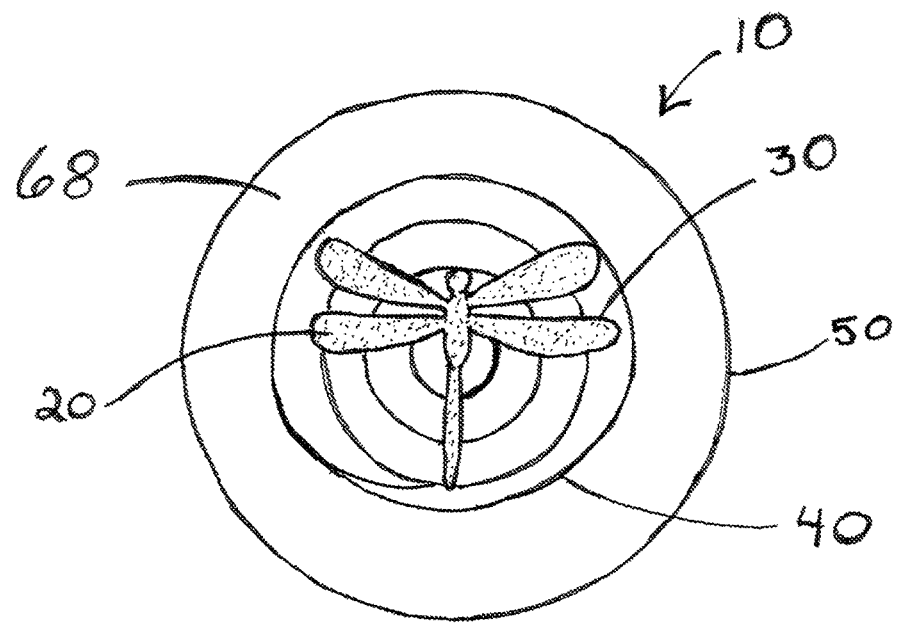
FIG. 1 is a top view of a spherical glass object in accordance with one embodiment.
Figure 2:
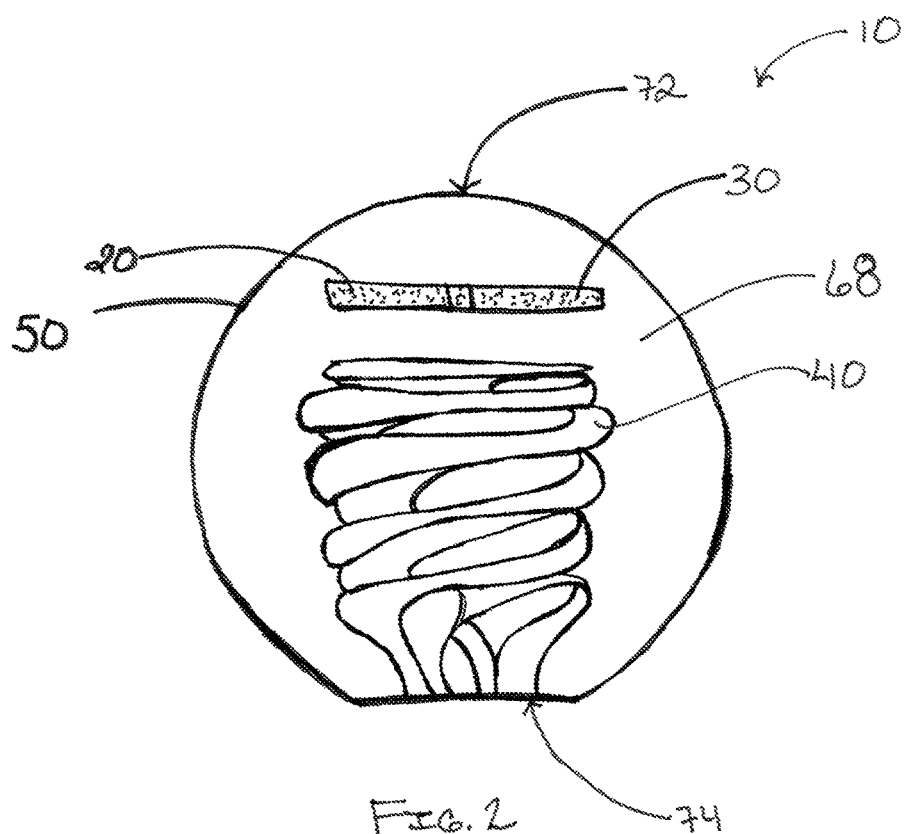
FIG. 2 is a side view of the spherical glass object of FIG. 1

The glass object 10, according to one embodiment, is spherical, includes a planar bottom surface 74, which enables the spherical glass orb to sit on flat surface, an image 30 formed from cremated remains 20, an interior glass article in the form of a colored glass article 40, a layer of glass 68 surrounding the image 30 and the colored glass article 40, and an exterior surface 50, as shown in FIGS. 1 and 2. The image 30 is located in the glass layer 68 between the exterior surface 50 and the colored glass article 40, is free from contact with the colored glass article 40, and appears to float above the colored glass article 40. The image 30 of cremated remains 20, when viewed from the top 72 of the glass object 10, resembles a pattern of cremated remains 20 that is used in the process of making the glass object 10. In this embodiment, when the image 30 formed by the cremated remains 20 is viewed from a side of the glass object 10, it appears substantially planar as illustrated in FIG. 2.

In the method of making the glass object, a gob of molten glass, which is also referred to as a "gather" or a "bit", is formed by placing a glass working tool such as a pipe in a pool of molten glass (e.g., molten glass that has a working temperature of about 2100° F.), turning the glass working tool to gather the molten glass onto the tool, and withdrawing the glass working tool from the pool of molten glass such that a gob of molten glass remains on the end of the tool. The gob can be in direct contact with the pipe, gathered over and in contact with a previously applied glass layer or article, or a combination thereof. After each gob of molten glass is gathered, it is optionally worked and shaped as desired.

Figure 4:
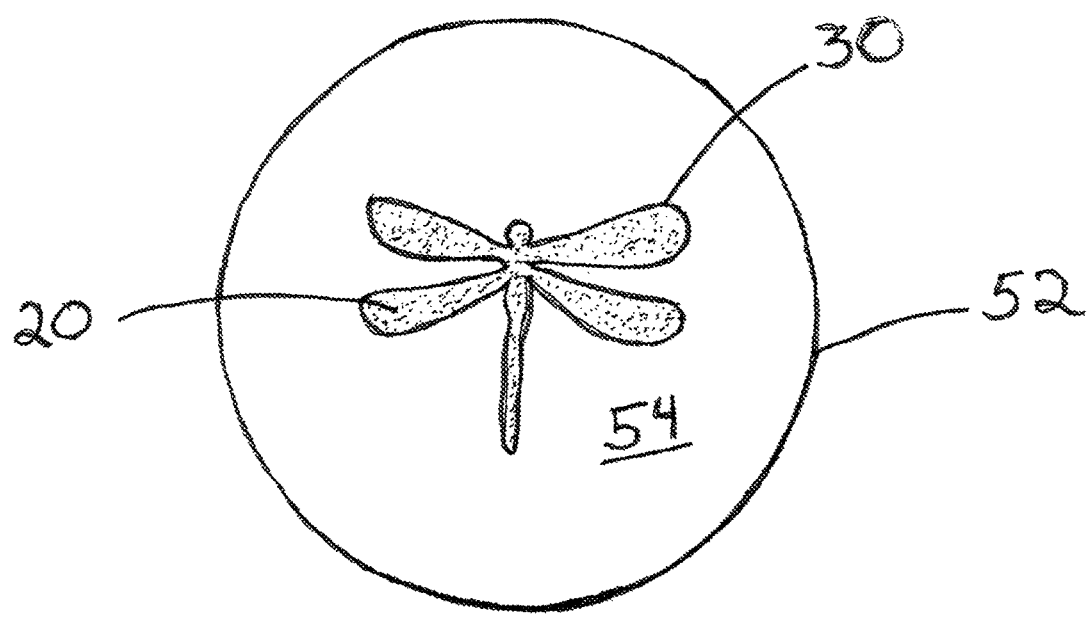
FIG. 4 is a top view of the pattern of cremated remains disposed the top surface of the gob of molten glass of FIG. 3.
Figure 3:
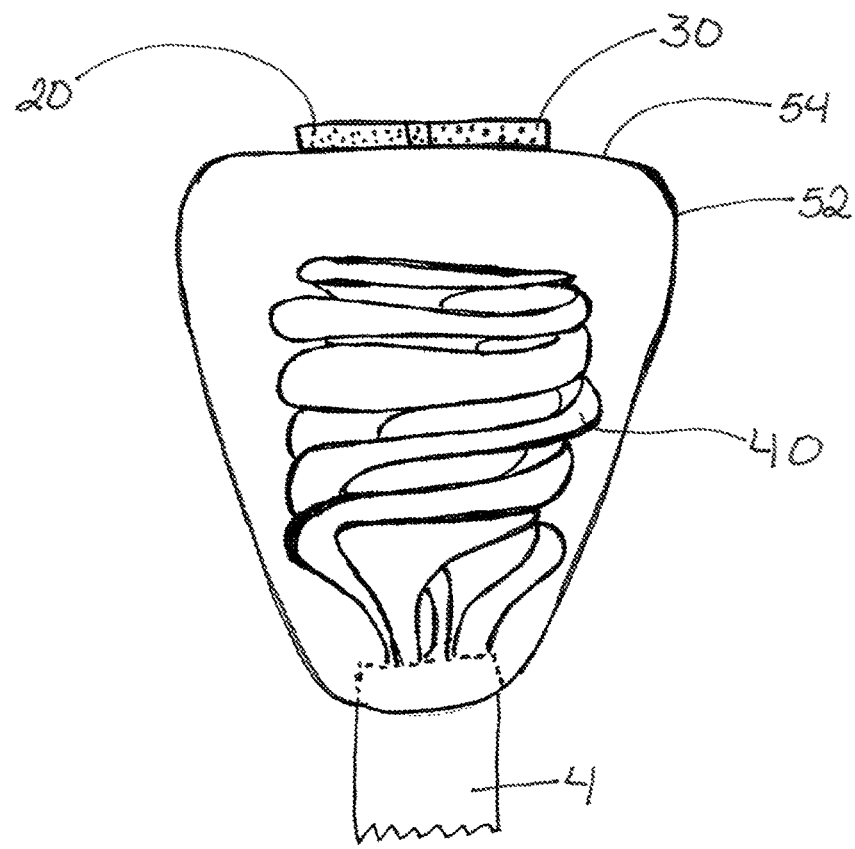
FIG. 3 is a side view of a concept of a stage in the method of making a glass object in which a pattern of cremated remains is disposed on a surface of a gob of molten glass that surrounds a colored glass article in accordance with one embodiment.
Figure 5:
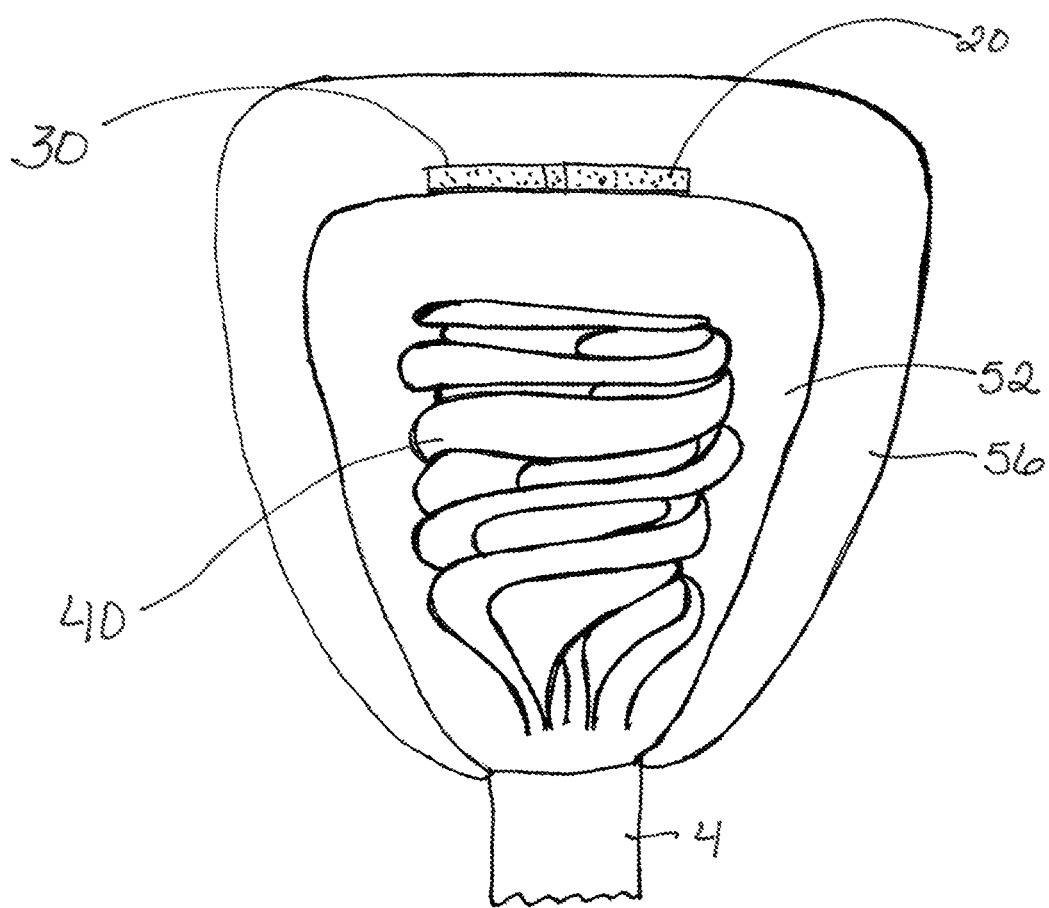
FIG. 5 is a side view of a concept of a stage of the method in which a second gob of molten glass surrounds the pattern of cremated remains, the first gob of molten glass, and the colored glass article of FIG. 4.

Turning to FIGS. 3-5, a conceptualization of one embodiment of a useful method of making a glass object 10 that includes cremated remains 20 in the form of an image 30 floating above a colored glass body such as the glass object 10 shown in FIGS. 1 and 2 is shown. The method includes forming a colored glass article 40 from a gob of molten glass and colored glass frit, contacting the colored glass article 40 with a gob 52 of molten glass by gathering molten glass over the colored glass article 40 to form a first layer of glass, contacting a predetermined pattern of cremated remains 20 with the gob 52 of molten glass in such a way as to transfer the pattern of cremated remains 20 to the exterior surface 54 of the gob 52 of molten glass, contacting the transferred cremated remains 20 and the gob 52 of molten glass with another gob 56 of molten glass by gathering molten glass over the pattern of cremated remains 20 and gob 52 of molten glass to form a second layer of glass that surrounds and encases the cremated remains 20, and annealing the glass to slowly allow the molten glass to cool (e.g., to room temperature) to form the solid glass object 10. The layers of glass resulting from the gobs (52, 56) of glass fuse together into one layer 68 of glass through which the image 30 and glass article 40 can be viewed in the final resulting glass object 10, as shown in FIGS. 1 and 2. Preferably layer 68 is transparent or translucent.

Turning to FIGS. 3 and 4, a conceptualization of one embodiment of a step in the method of making the glass object 10 is shown. The colored glass article 40 is shown attached to a glass working tool, which is in the form of a metal pipe 4, and a first gob 52 of molten glass that has been gathered over the colored glass article 40 is shown surrounding and encasing the colored glass article 40. The cremated remains 20, which are in the form of a predetermined image 30, are shown as having been transferred to the surface 54 of the first gob 52 of molten glass. At this stage, the layer formed by the gob 52 of molten glass surrounding the colored glass article 40 is not actually visible to the naked eye as the glass is molten.

In FIG. 5, another step of the conceptualized method is shown in which the colored glass article 40 is attached to the metal pipe 4, a first layer of glass formed from the first gob 52 of molten glass surrounds the colored glass article 40, the transferred image 30 of cremated remains 20 is disposed on the first gob 52, and a second gob 56 of molten glass has been gathered over the first gob 52 of molten glass to surround and encase both the cremated remains 20, the first gob 52 of molten glass, and the colored glass article 40. At this stage the individual layers formed by the first 52 and second 56 gobs of molten glass are not actually visible to the naked eye as the glass is molten. In the final glass object, the first and second gobs of glass (52 and 56) will have fused together and might appear as a single layer 68.

After a gob 52 of molten glass is gathered over the colored glass article 40, the method optionally additionally includes manipulating the gob of molten glass in such a way as to cause a major portion of the leading edge of the gob (i.e., the end farthest from the glass working tool 4) to taper away from the colored glass article 40 such that the leading edge of the gob terminates in a tapered point. A variety of glass-working techniques and tools can be used to create the taper in the glass including such tools as wet newspaper, pliers, tweezers, and tongs. The tapered point of the gob is then brought into contact with the pattern of cremated remains positioned on a glass working table, preferably without noticeably scattering the cremated remains. As the tapered point is pressed into contact with the pattern of cremated remains (e.g., the pattern of cremated remains can be disposed on a glass working table such as a marvering table) the molten glass of the gob slumps down over the cremated remains to achieve direct contact between the cremated remains and the surface of the molten gob and to transfer the cremated remains to the gob. The molten glass is then removed from the glass working table and processed as described above. Additional gobs of molten glass can be gathered over previously applied layers and gobs of molten glass and optionally additional patterns of cremated remains from the same or different deceased being can be transferred to the glass object being formed. These process steps can be repeated any number of times to achieve a desired glass object.

The method of making the glass object optionally additionally includes exposing the transferred cremated remains to a temperature sufficiently high to allow the cremated remains to off gas prior to gathering a gob of molten glass over the cremated remains. One useful method of off gassing includes placing the transferred cremated remains disposed on the gob of molten glass in a furnace (e.g., a Glory Hole furnace) heated to a temperature sufficient to off gas all of the volatiles in the remains (e.g., a temperature of about 1700° F.) and exposing the cremated remains to the temperature for a period of time sufficient to fully off gas the volatiles of the remains (e.g., from about 1 second to about 20 seconds, from about 5 seconds to about 20 seconds, or even about 10 seconds). In the heat of the furnace the cremated remains are exposed to a temperature sufficiently high to cause any material remaining in the cremated remains that can give off a gas to do so. Heating the cremated remains to allow off gassing to occur decreases and preferably prevents the cremated remains from subsequently causing uncontrolled and unintentional gas bubbles to form when a gob of molten glass is subsequently applied over the cremated remains.

The pattern of cremated remains can be of any desired shape and size and can form any desired image including, e.g., a dragonfly, a butterfly, a heart, a pawprint, a footprint, a fingerprint, a nose print (e.g., of an animal), a dog, a cat, a star, a galaxy, a face, a silhouette, and combinations thereof. One useful method of forming the pattern of cremated remains includes placing the cremated remains in the opening of a stencil positioned on a glass working table to form the pattern of cremated remains, optionally removing the stencil to reveal the pattern of cremated remains, and then contacting the pattern of cremated remains with the second gob of molten glass. Any other suitable method of forming a pattern of the cremated remains can also be used. The cremated remains can be from a cadaver of any being including, e.g., a human, a dog, a cat, a rabbit, and a guinea pig.

The colored glass article is visible to the naked eye through the exterior of the glass object and exhibits a defined shape. The colored glass article can be of any desired color, size and shape including, e.g., spiral, a toroid, a sphere, a cube, a polyhedron (e.g., a rectangular parallelpiped), a cylinder, a cone, a rhombohedron, pyramidal (e.g., a tetrahedron, hexagonal pyramidal, rectangular pyramidal, and square pyramidal), an ellipsoid, an egg-shape, a tear drop shape, and combinations thereof. The colored glass article can also depict a scene including, e.g., a scene from nature such as a tree, a field, a stream, a flower garden, a home, and combinations thereof. The colored glass article can be a single colored glass article or multiple glass articles of the same or different color, shapes, and sizes. The colored glass article also can have any desired appearance including, e.g., transparent, translucent, opaque, and combinations thereof.

In one embodiment, the colored glass article is in the shape of a spiral, which can be formed by rotating a glass-working tool that includes a gob of colored molten glass while holding the gob of molten colored molten glass stationary. Alternatively, the glass-working tool can be held stationary while the gob of colored molten glass is turned. The rotating movement of the molten glass causes the glass to form a spiral shape. A variety of glass-working tools, such as pliers or tongs, can be used to turn, manipulate and form the colored molten glass into any desired shape.

Any suitable method can be used to form the glass object into the desired shape and the resulting glass object can exhibit any desired shape including, e.g., a sphere, a cube, a polyhedron (e.g., a rectangular parallelpiped), a cylinder, a cone, a rhombohedron, pyramidal (e.g., a tetrahedron, hexagonal pyramidal, rectangular pyramidal, and square pyramidal), an ellipsoid, an egg-shape, a tear drop shape, a spiral, a toroid, and combinations thereof, optionally with at least one planar surface.

The glass object can perform a variety of functions including, e.g., a memorial for the deceased, to perpetuate the memory a loved one has of the deceased, and combinations thereof. The glass object can provide a means for displaying cremated remains and can be made using a small portion of the cremated remains allowing multiple memorial products to be created from the same cremated remains. In some embodiments, the glass object includes the cremated remains of at least two deceased beings each existing as a separate image, combined to form a single image, and combinations thereof.

Figure 6:
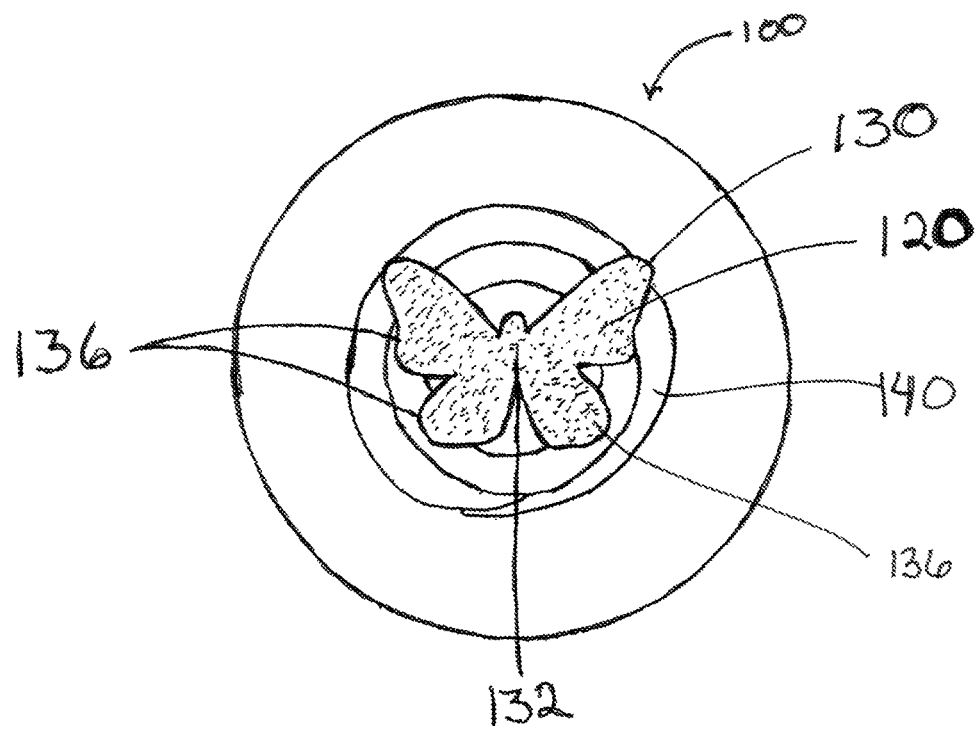
FIG. 6 is a top view of a spherical glass object including an image of cremated remains according to another embodiment.
Figure 7:
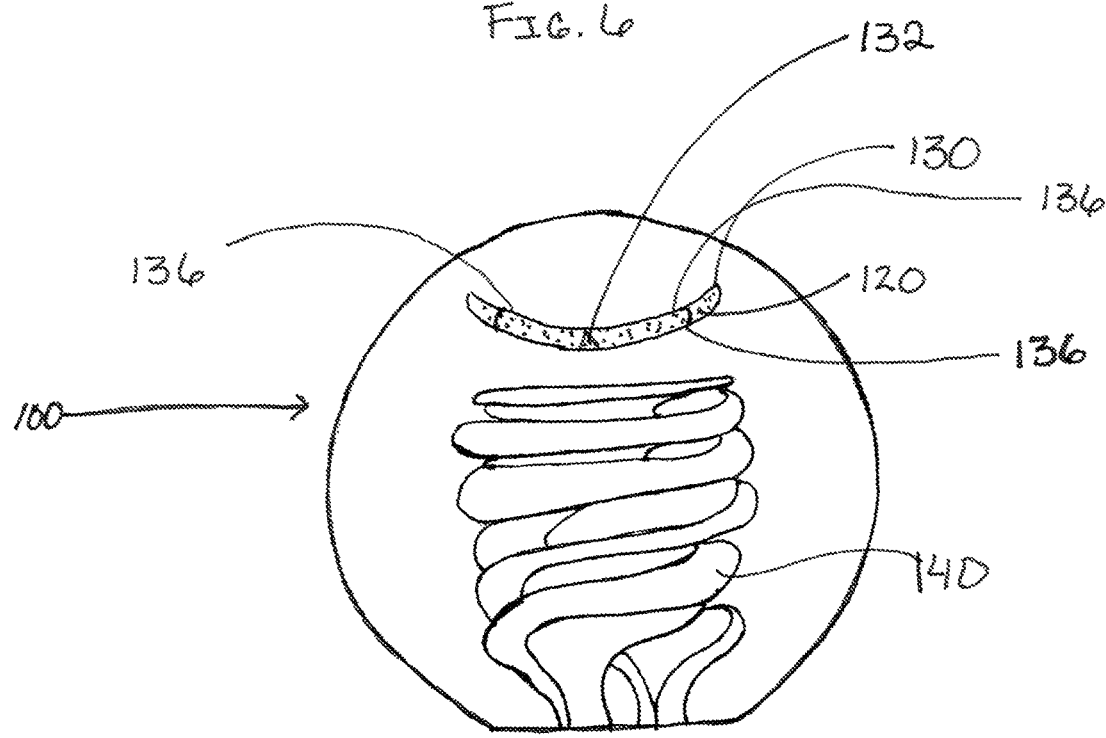
FIG. 7 is a side view of the spherical glass object of FIG. 6.

Other embodiments are within the claims. Although the image has been described as being substantially planar within the glass object, in other embodiments the image appears relatively more three dimensional as seen, for example, from a side of the glass object 100, as shown in FIG. 7. In the embodiment shown in FIGS. 6 and 7, the cremated remains 120 are in the form of a butterfly 130 that includes a first member in the form of a body 132 in a first plane and second members in the form of two wings 136 extending above and away from the plane of the body 132. The butterfly 130 appears to be in flight, the wings 136 are raised up and appear ready to be brought down to a lower position to continue the upward flight pattern. The butterfly 130 appears to fly above the colored glass article 140.

Figure 8:
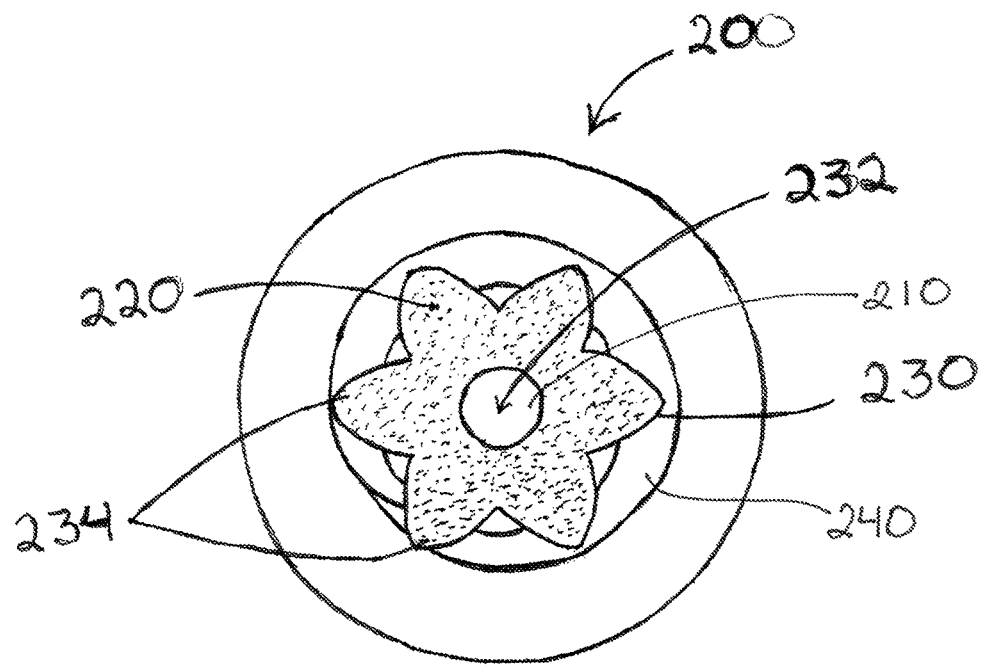
FIG. 8 is a top view of a spherical glass object including an intentional bubble in accordance with another embodiment.
Figure 9:
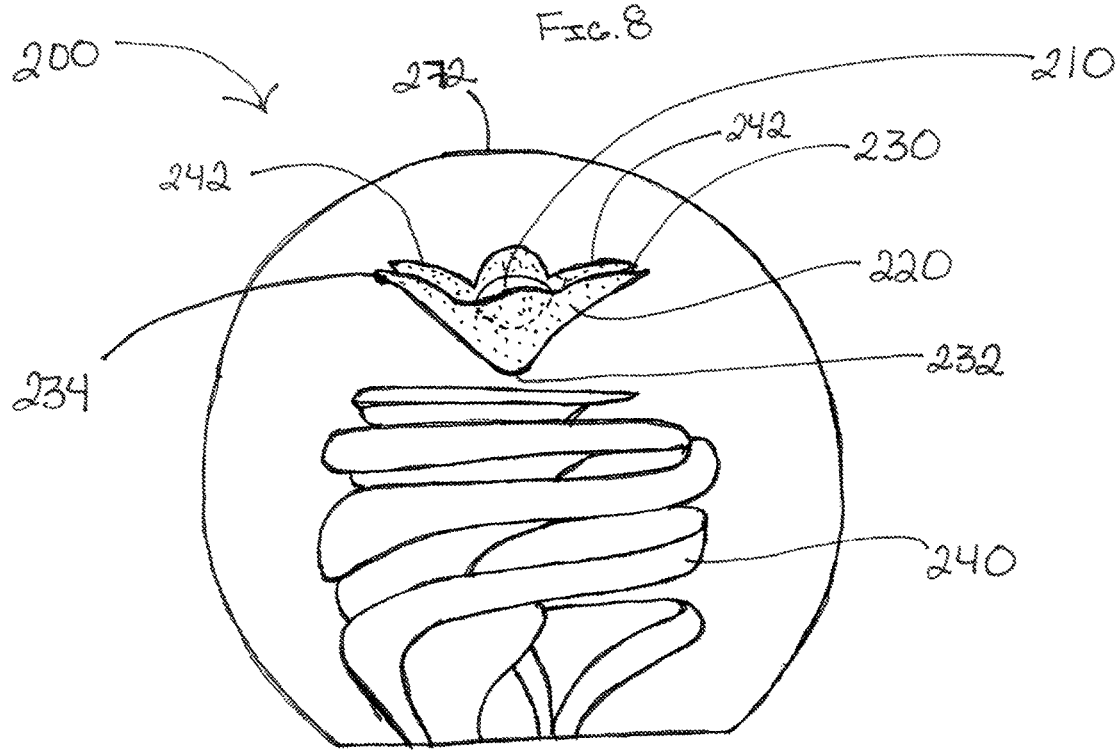
FIG. 9 is a side view of the spherical glass object of FIG. 8.

In another embodiment, the glass object 200 includes a bubble 210 intentionally formed and positioned near the image 230 of a flower formed by cremated remains 220, which is located above a colored glass article 240, as shown in FIGS. 8 and 9. The image 230 of cremated remains 220 is in the form of a flower that includes a center portion 232 and members in the form of petals 234 extending radially outward from the center portion 232. The intentionally formed bubble 210 is located approximately at the center 232 of the image 230 as viewed from the top 272 of the glass object 200 and appears at least partially within the image 230 of cremated remains 220 and below the uppermost plane reached by the uppermost surfaces 242 of the petals 234, when viewed from a side of the glass object 200, as shown in FIG. 9. The bubble 210 appears to weigh down the center portion 232 of the flower 230 as the petals 234 rise above the center portion 232. Although a single bubble has been shown, the glass object optionally includes multiple bubbles intentionally formed in the glass object and arranged as desired.

Although the image has been described as being made from cremated remains, in other embodiments the image is prepared from particles of materials other than or in addition to the particles of the cremated remains. Such materials must preferably do not melt or evaporate when placed in contact with molten glass at a temperature of 2100° F. Such particles can be made from a variety of minerals and rocks including, e.g., dolomite, silica, magnetite, calcium sulfate, and mixtures thereof. Such particles can have any suitable particle size including, e.g., at least 1 micron (μm), at least 10 μm, no greater than 1000 μm, no greater than 800 μm, no greater than 500 μm, from 10 μm to 800 μm, from 10 μm to 500 μm, or even from 10 μm to 100 μm.

In other embodiments, the method also includes intentionally forming a plurality of bubbles within the memorial product prior to solidification of the molten glass. The bubbles can be formed in any portion or layer of glass as desired.

In some embodiments, the second or subsequent gobs of molten glass include color. The method optionally additionally includes contacting a colored glass in the form of a powder or small particles (which are also known as "frit") with the exterior surface a gob of molten glass (e.g., by rolling the gob of molten glass in the powder or small particles) and then partially or completely melting the colored glass.

Although the colored glass article is described as being colored, in other embodiments the glass object includes a colorless (and optionally clear) glass interior article that is visible through the exterior surface of the glass object. For example, the glass article is colorless and the glass layer surrounding it is colored. In some embodiments, the first interior glass article is a clear, colorless glass article that includes bubbles and is surrounded by at least one layer of glass that is different from the interior glass articles including, e.g., is free of bubbles, is colored, includes bubbles of a different size relative to the first interior glass article, and combinations thereof.

What is claimed is:

1. A method of making a glass object, the method comprising:
    contacting a colored glass article with a first gob of molten glass;
    contacting a pattern of cremated remains with the first gob of molten glass to transfer the pattern of cremated remains to a surface of the first gob;
    contacting the transferred cremated remains and the first gob with a second gob of molten glass; and
    annealing the glass to form the glass object having an exterior surface,
    the pattern of cremated remains being disposed between the colored glass article and the exterior surface of the glass object and forming an image that appears to float above the colored glass article.

2. The method of claim 1 further comprising
    placing the cremated remains in the opening of a stencil to form the pattern of cremated remains.

3. The method of claim 2 further comprising removing the stencil prior to contacting the pattern of cremated remains with the first gob of molten glass.

4. The method of claim 1 further comprising heating the transferred cremated remains prior to contacting the transferred cremated remains with the second gob of molten glass.

5. The method of claim 1 further comprising
    pushing a portion of the transferred cremated remains into the first gob of molten glass prior to contacting the transferred cremated remains and the first gob with the second gob of molten glass; and
    forming a bubble near the pushed portion of transferred cremated remains.

6. A glass object comprising:
    a first colored glass article;
    a second transparent glass layer in contact with the first glass article and having an exterior surface and a thickness; and
    an image formed of particles of cremated remains, the image being disposed within the thickness of the second glass layer and between the first colored glass article and the exterior surface of the second glass layer, the image being free from contact with the first colored glass article.

7. The glass object of claim 6, wherein the glass object is in the form of a spherical orb.

8. The glass object of claim 6, wherein the glass object is in the form of a spherical orb comprising a planar surface.

9. The glass object of claim 8, wherein the planar surface is located opposite the image.

10. The glass object of claim 6, wherein the image is in a plane within the glass object.

11. The glass object of claim 6, wherein the image comprises a body in a first plane and at least one member extending from the body in an upward direction away from the first plane.

12. The glass object of claim 6, wherein the object comprises a top and further comprises a bubble positioned to appear at a center of the image when viewed from the top of the glass object.

13. The glass object of claim 12, wherein the image comprises a center portion and members extending radially from the center portion, the bubble being positioned to appear at the center portion of the image when viewed from the top of the glass object.

14. The glass object of claim 6, wherein the image is in the form of a dragonfly, a butterfly, a heart, a pawprint, a dog, a cat, a star, a flower, or a combination thereof.

15. A glass object comprising:
    a first glass article comprising a defined shape;
    a second transparent glass layer in contact with the first glass article and having an exterior surface and a thickness; and
    an image formed of particles of cremated remains, the image being disposed within the thickness of the second glass layer and between the first glass article and the exterior surface of the second glass layer, the image being free from contact with the first glass article.

16. The glass object of claim 15, wherein the glass object is in the form of a spherical orb.

17. The glass object of claim 15, wherein the glass object is in the form of a spherical orb comprising a planar surface.

* * * * *